May 5, 1964  P. L. DEYDIER  3,131,862
THERMOSTATIC MIXER

Filed Oct. 17, 1960  2 Sheets-Sheet 1

INVENTOR:
PIERRE LOUIS DEYDIER

May 5, 1964  P. L. DEYDIER  3,131,862
THERMOSTATIC MIXER
Filed Oct. 17, 1960  2 Sheets-Sheet 2

INVENTOR:
PIERRE LOUIS DEYDIER

3,131,862
THERMOSTATIC MIXER
Pierre Louis Deydier, 8 Rue du Bosquet,
Marseille, France
Filed Oct. 17, 1960, Ser. No. 63,228
Claims priority, application France Nov. 14, 1959
1 Claim. (Cl. 236—12)

This invention relates to valves for the mixing of hot and cold water so as to obtain a flow at a desired temperature.

The object of the invention is to provide an improved construction of that type of mixing valve which is adapted to control the mixing function by means of a device which is sensitive to variations in temperature.

According to the invention, a mixing device for hot and cold water supplies comprises a dispenser body, said dispenser body having a mixing chamber, said dispenser body having a plurality of feed passages for hot water opening into the mixing chamber at hot water feed openings, said dispenser body having the same number of feed passages for cold water opening into the mixing chamber at cold water feed openings, associated hot and cold water feed openings being disposed in pairs symmetrically arranged about the wall of the mixing chamber, a rotor disposed in said mixing chamber and carrying a plurality of stoppers symmetrically arranged and radially spaced thereon, said stoppers contacting the wall of the mixing chamber whereby rotation of the rotor serves to position the stoppers so as to open and close selectively the hot water feed openings and the cold water feed openings, and a thermo-operable device disposed in the body in the path of flow of water from the mixing chamber, said thermo-operable device being coupled between the rotor and the body for relative rotation of the rotor according to the temperature of the mixture of water flowing from the mixing chamber.

An embodiment of mixing valve in accordance with the invention is hereinafter particularly described by way of example with reference to the accompanying drawings, wherein.

Figure 1:
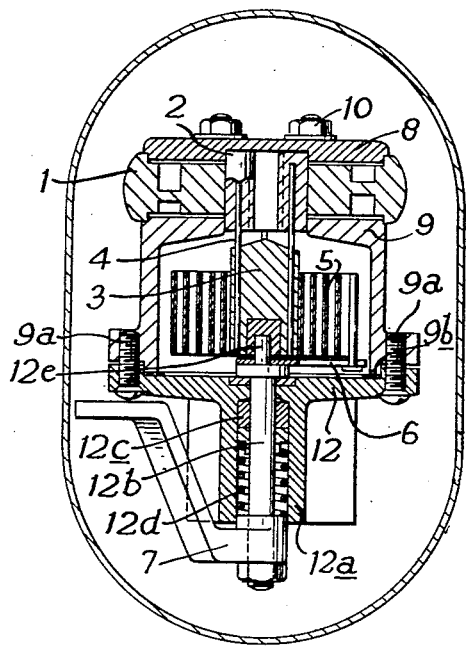
FIG. 1 is a vertical section of the valve, taken on a plane shown at the line A—B in FIG. 2.
Figure 5:
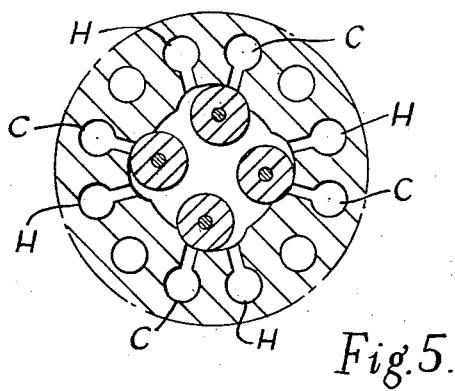
FIGS. 5, 6 and 7 are schematic horizontal sectional views of the mixing chamber and stoppers therein, to indicate different possible positions.
Figure 6:
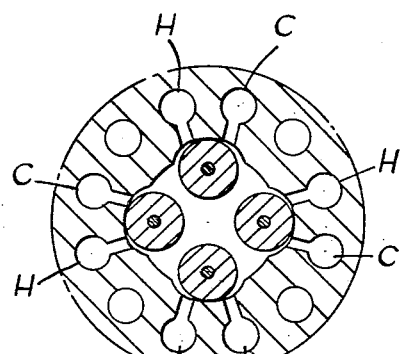
Figure 7:
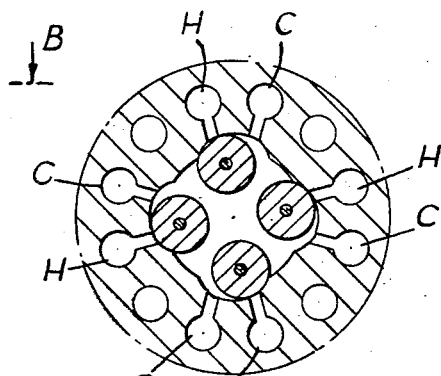

FIG. 5 showing a position wherein only hot water is allowed into the mixing chamber;

FIG. 6 showing a position wherein both hot and cold water are allowed into the mixing chamber, and FIG. 7 showing a position wherein only cold water is allowed into the mixing chamber.

In these drawings, the valve comprises a body constituted by a base plate 12 on which a housing 9 is secured by screws 9a, a gasket 9b being placed between the two to keep the joint water tight. On top of the housing 9 is disposed a mixing chamber 1 retained in position by a closing plate 8 secured by nuts 10 engaged on threaded pillars passing through the plate and chamber. Gaskets are provided between the housing 9 and the mixing chamber 1, and between the mixing chamber 1 and the closing plate 8.

Figure 3:
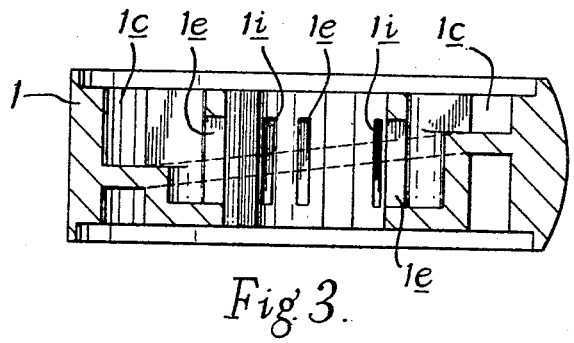
FIG. 3 is a vertical section of a mixing chamber, taken on the plane indicated at the line C—D of FIG. 4.
Figure 4:
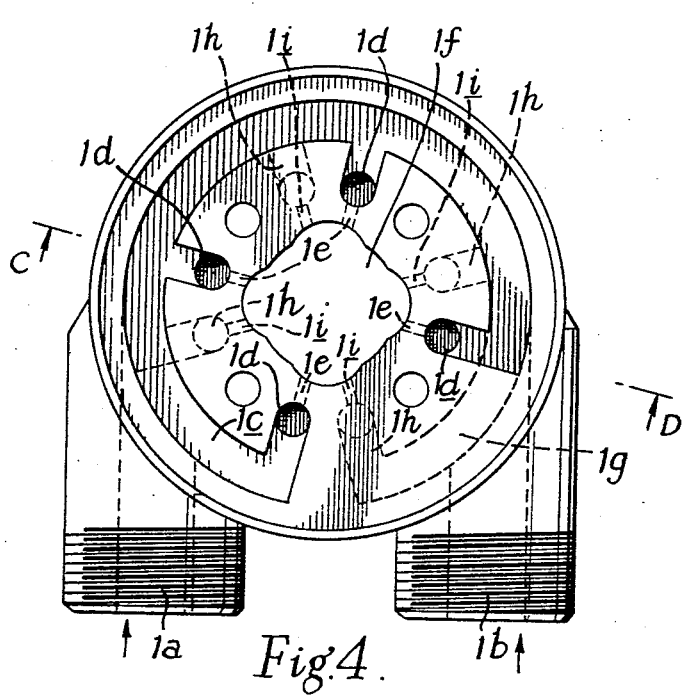
FIG. 4 is a schematic plan view of the mixing chamber, to illustrate water flow passages therein.

The mixing chamber is a short cylindrical body having a number of water flow passages, as best seen in FIGS. 3 and 4. On the chamber is a first inlet union 1a, say for hot water, and a second inlet union 1b, say for cold water. The union 1a has its passage communicating with a part-circular passage 1c off which are branched four equally spaced radial passages 1d each having a radial opening at 1e leading to a common central chamber 1f. The second inlet union 1b has its passage communicating with another part-circular passage 1g off which are branched four equaly spaced radial passages 1h each having a radial opening 1i also leading to the common central chamber 1f.

On the base plate is formed a tubular neck 12a within which is rotatably disposed a shaft 12b the joint between the two being made watertight by a packing 12c pressed by a spring 12d. The upper end of the shaft is formed as a journal 12e on which is rotatably mounted a rotor 3 carrying two pairs of diametrically opposed drive pins 4. On each drive pin there is rotatably engaged a roller stopper 2 made of a material such as "Teflon." The drive pins are made of a flexible material in order that they may bias the rollers against the arcuate inner walls of the mixing chamber. This arrangement allows the rollers to rotate freely without becoming bound against the inner walls. If the rollers bind, they will slide instead of rotate which might affect the operation and prevent the desired control function. These four rollers 2 are disposed within the common chamber 1f of the mixing chamber. It will be seen, in FIG. 4, that the internal wall of the mixing chamber is made arcuate at four symmetrically disposed areas with these areas having a greater radius of curvature than the rollers. In order that a positive closure of the ports may be effected, the end slopes between adjacent pairs of hot and cold water openings opposite to the arcuate areas has substantially the same radius of curvature as the rollers. Thus, the positive closure of the openings does not depend upon the deformation of the rollers. One "hot water" opening 1e and one "cold water" opening 1i opens at each of these four areas. Each such area has a roller 2 in rolling contact with it. Thus, the rotor 3 may be placed in relative positions, with respect to the chamber 1, in which the four rollers 2 either (a) close off all the "cold water" inlets but leave the "hot water" inlets clear (FIG. 5), or (b) leave both the "cold water" and the "hot water" inlets clear as variably desired (FIG. 6), or (c) close off the "hot water" inlets, but leave the "cold water" inlets clear (FIG. 7). Movement of the rotor between the two extreme positions of FIGS. 5 and 7 permits entry of water ranging from hot (only) to cold (only), with stepless variation of mixtures between those extremes.

Figure 2:
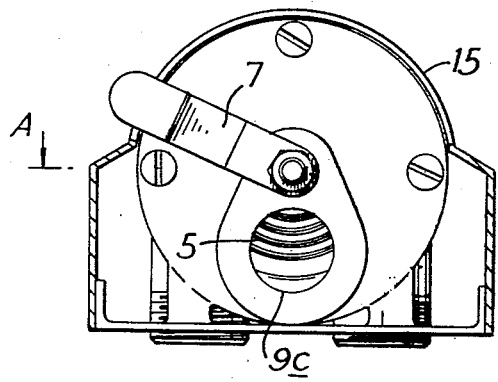
FIG. 2 is an underplan of the valve.

Water entering the mixing chamber 1 flows downwardly into the interior of the housing 9 and out through an aperture (the position of which is indicated in FIG. 2 at 9c) into a simple outflow control valve, the details of which may be conventional and which forms no part of the invention.

To control movement of the rotor, there is provided a thermo-operable device in the form of a spiral bi-metal element 5 having one of its ends connected to the rotor 3 and the other of its ends coupled to a radius arm 6 mounted on the shaft 12b. The outer end of the shaft carries a control arm 7 for rotation of the shaft 12b, whereby the angular position of the radius arm 6 can be altered. This permits pre-setting of the position of the rotor and thus also of the rollers 2 within respect to the chamber 1, whereby variation of the working temperature of the mixing valve is obtainable.

This valve has the following advantages:

By reason of the design of the mixing chamber and the housing 9, if any scale or sludge accumulates it tends to pass immediately through into the housing rather than staying in the chamber. If "Teflon" (registered trademark) is used for the rollers, and if a silicone varnish is used on the bi-metal strip, there is substantially no possibility of scaling occurring. Pressure variations which may occur in the water feeds having substantially no effect on the mixing temperature because the variations always act symmetrically on the rollers. The bi-metal acts directly on the rollers, without other intermediary apparatus, and there is no friction produced between the movable and stationary members, the rollers moving by a rolling action on the chamber walls.

All the components can be readily disassembled, and their construction permits them to be made by moulding, for low manufacturing cost.

I claim:

A mixing device for hot and cold water supplies comprising a dispenser having a body in which is provided a cylindrical mixing chamber, a plurality of pairs of feed passages connected to said mixing chamber through said dispenser, an arcuate wall between the two feed passages of each of said pairs, said arcuate walls being coaxial with said cylindrical mixing chamber, a rotor disposed coaxially in said mixing chamber, a plurality of flexible drive pins mounted about said rotor and extending therefrom substantially parallel to the rotor axis, a cylindrical roller rotatably mounted on the outer end of each of said pins, said rollers being held in engagement with said arcuate walls by said flexible pins, an arcuate slope adjacent to each of said feed passages opposite to said arcuate walls, said arcuate slope having substantially the same radius of curvature as said rollers, and a spiral bi-metal thermo-operable device connected at one end to the rotor and at the other end to anchorage means on said dispenser body whereby the bi-metal device rotates said rotor in response to temperature variations within the mixing chamber.

References Cited in the file of this patent

UNITED STATES PATENTS

| | | |
|---|---|---|
| 870,377 | Marett | Nov. 5, 1907 |
| 1,715,662 | Laskey | June 4, 1929 |
| 1,787,304 | Becker | Dec. 30, 1930 |
| 1,862,564 | Bern | June 14, 1932 |
| 2,165,874 | Sauls | July 11, 1939 |
| 2,235,651 | Slezak | Mar. 18, 1941 |
| 2,332,995 | Eaton | Oct. 26, 1943 |
| 2,767,924 | Barker | Oct. 23, 1956 |